(12) United States Patent
Pérez

(10) Patent No.: US 9,394,688 B2
(45) Date of Patent: Jul. 19, 2016

(54) COMPOSE STAVE FLOORING, PRODUCTION METHOD THEREOF, AND CORRECTIVE MAINTENANCE OF SAME

(76) Inventor: Roberto Ortega Pérez, Mexico (MX)

( * ) Notice: Subject to any disclaimer, the term of this patent is extended or adjusted under 35 U.S.C. 154(b) by 0 days.

(21) Appl. No.: 13/700,088

(22) PCT Filed: May 25, 2011

(86) PCT No.: PCT/MX2011/000063
§ 371 (c)(1),
(2), (4) Date: Nov. 26, 2012

(87) PCT Pub. No.: WO2011/149322
PCT Pub. Date: Dec. 1, 2011

(65) Prior Publication Data
US 2013/0067855 A1    Mar. 21, 2013

(30) Foreign Application Priority Data

May 28, 2010  (MX) .................... MX/a/2010/005899
May 25, 2011  (MX) .................... MX/a/2011/005499

(51) Int. Cl.
*E04C 2/34*   (2006.01)
*E04B 5/00*   (2006.01)
*E04F 15/04*  (2006.01)
*B32B 37/18*  (2006.01)
*E04C 2/00*   (2006.01)

(52) U.S. Cl.
CPC . *E04B 5/00* (2013.01); *B32B 37/18* (2013.01); *E04C 2/00* (2013.01); *E04F 15/042* (2013.01)

(58) Field of Classification Search
USPC ............. 52/179, 313, 314, 384, 591.2, 783.1
See application file for complete search history.

(56) References Cited

U.S. PATENT DOCUMENTS

| | | | | |
|---|---|---|---|---|
| RE8,807 E | * | 7/1879 | Cummings | 52/591.2 |
| 647,626 A | * | 4/1900 | Gilmour | 52/783.15 |
| 647,627 A | * | 4/1900 | Gilmour | 52/783.15 |
| 5,109,898 A | * | 5/1992 | Schacht | 144/350 |
| 6,115,975 A | * | 9/2000 | Abdollahi | 52/179 |
| 6,125,607 A | * | 10/2000 | Poce | 52/847 |
| 7,650,918 B2 | * | 1/2010 | Schiedegger et al. | 144/347 |
| 2003/0097808 A1 | * | 5/2003 | Sabatini | 52/384 |
| 2009/0183457 A1 | * | 7/2009 | Boucke | 52/425 |
| 2013/0067855 A1 | * | 3/2013 | Perez | 52/750 |

OTHER PUBLICATIONS

PCT/MX2011/000063 International Preliminary Report on Patentability (Written Opinion) dated Dec. 4, 2012.

* cited by examiner

*Primary Examiner* — Andrew J Triggs
(74) *Attorney, Agent, or Firm* — Matthew J. Lattig; Charter IP, LLC

(57) ABSTRACT

Example embodiments relate to improvements to composed stave flooring, methods for the production thereof and the corrective maintenance of same. The improvements allow corrective maintenance to be performed without negatively affecting the physical aesthetic and functional properties thereof. The flooring comprises a sight substrate and a base substrate, with the sight substrate having a minimum practical thickness of 4 mm and the base substrate having a minimum practical thickness of 12 mm, the two substrates being assembled using adhesive and securing means that distribute the adhesive uniformly between both substrates, thereby rendering the flooring more durable and stable.

5 Claims, 5 Drawing Sheets

CONVENTIONAL ART

CONVENTIONAL ART

CONVENTIONAL ART

COMPOSE STAVE FLOORING, PRODUCTION METHOD THEREOF, AND CORRECTIVE MAINTENANCE OF SAME

CROSS-REFERENCE TO RELATED APPLICATIONS

The present application claims the benefit under 35 U.S.C. §365(a) of PCT International Patent Application Ser. No. PCT/MX2011/000063 to the inventor, filed May 25, 2011, now pending, which in turn claims priority to co-pending Mexico patent application Ser. Nos. MX/a/2011/005499, filed May 25, 2011, and MX/a/2010/005899, filed May 28, 2010, each by the same invento. The entirety of the contents of each application is hereby incorporated by reference herein.

BACKGROUND

1. Field

The example embodiment in general relates to stave floors, in particular to modular composed stave floors.

2. Related Art

In patent application number MX/a/2010/005899, there are disclosed the drawbacks that exist in composed stave floors or engineering floors, which include at least a base substrate (after face) also known as a core and at least a sight substrate, of finished (face) or top part for the traffic surface. The sight substrate is selected from a group that consists of: noble hard woods, exotic woods, capricious woods which, for the formation of its seam, have great acceptance on the market.

In the known stave floors, the minimum material to be rushed for corrective maintenance is 1 mm, while it is known that the sight substrate, also referred to as micro plates or plates, has a thickness from 2 to 3 mm. The drawback of such a thin sight substrate thickness is that upon being sanded or rushed, the remaining material warms up and tends to be deformed and eventually becomes partially or completely detached, thereby completely spoiling the appearance of the floor, as related to its physical, aesthetic and functional properties.

Generally speaking, the micro plate or plate that constitutes the sight substrate, is "de-rolled" wood of the tree trunk from which it is obtained. This affects the aesthetic properties of the final product since the forces of the mechanical action on "de-rolling" generate a sheet that will tend to curl or recover its cylindrical original form. The base substrate nowadays is composed of slung wood or is plated against (triplay). Both sheets are joined by means of glue. A disadvantage of using only glue is that with the open period, both sheets can suffer deformations and/or changes of displacement between them, as well as changes of dimensions. Another disadvantage is that it is necessary to provide a uniform and level surface of assembly, in order to assemble both sheets, as well as to maintain a constant pressure in order to reach the desired adhesion when the glue is uniformly distributed between both substrates. Another disadvantage is the long cure or wait time that the pieces must remain static, without moving. So that the glue completely hardens, the cure or wait time may stretch several days.

The compose stave floors life, due to the thin thickness of the plate of the noble layer or sight substrate therein, is very short, and with no possibility of providing corrective maintenance. Though the materials are supplied pre-varnished from the supplier, the thin thickness of the sheet does not offer a solid base of attachment, the resistance of the glaze is poor, is susceptible to be easily scratched, or easily suffers the effect of peeling.

Currently, one problem of joining both sheets of plate is in preventing the displacement or change of dimensions. As previously noted, different factors, prevent that the sheets are fixed in a firm way, even though patent application number MX/a/2010/005899 tried to solve the problem, finding great benefits, it was not the optimal solution.

SUMMARY

An example embodiment is directed to a method for the manufacture of composed stave floors. The method includes providing a sight substrate having a thickness of at least 4 mm and providing a base substrate having a thickness of at least 12 mm. The base substrate and sight substrate are assembled together with glue and multidirectional holding means. The multidirectional holding means consist of dendrites, adhesion and horizontal reinforcement means, in the union plane; and adhesion and vertical reinforcement means, normal to the union plane.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus do not limit the example embodiments.

DETAILED DESCRIPTION

Whereas the example embodiments will be described hereafter, it should be understood that the above mentioned embodiments will not limit the invention. The sizes in the figures are exaggerated with purpose of clarity.

One object of the example embodiments is to preserve the physical, aesthetic and functional properties in sight substrate of composed stave floors or engineering floors.

Another object is to provide a sight substrate for composite stave compounds or engineering floors, without any trend to be deformed.

An additional object is to bond both sheets without displacement or change of dimensions, using bonding means such as dendrite, glue, knitted wire, clamps, or cemented clamps or divergent legs.

Another object is to provide to the floors with a major time of useful life and to allow giving it corrective maintenance.

An additional object is to provide improved composed stave floors, with applied glaze from the supplier, eliminating the time and the inconveniences of the application of the glaze in a period of the installation. Site preferred glazes include aluminum oxide or another metal that provide higher hardness without changing its aesthetic appearance.

All the numbers, numerical parameters and/or ranges that are expressed here with, for example, sizes or thicknesses, used in the specification and claims, are to be understood as modified in all the instances by the term "approximately". Accordingly, unless it is indicated on the contrary, the numerical parameters established in the following specification and attached claims are approximations that can change depending on the properties provided by the example embodiments. At a minimum, and not as an attempt for limiting the application of the doctrine of equivalents to the scope the claims, every numerical parameter should be considered at least in the light of the number of significant reported digits and for application of techniques of ordinary rounded.

Likewise, there is to be understood that any numerical range described herein is intended to embrace all the subranges there included: for example, a range of "1 to 10" is intended to include all the intermediate sub-ranges (and including) the minimal described value of 1 and the maximum described value of 10, this is with a minimal value equal to, or major that 1 and one maximum value equal to, or minor that 10.

Figure 1:
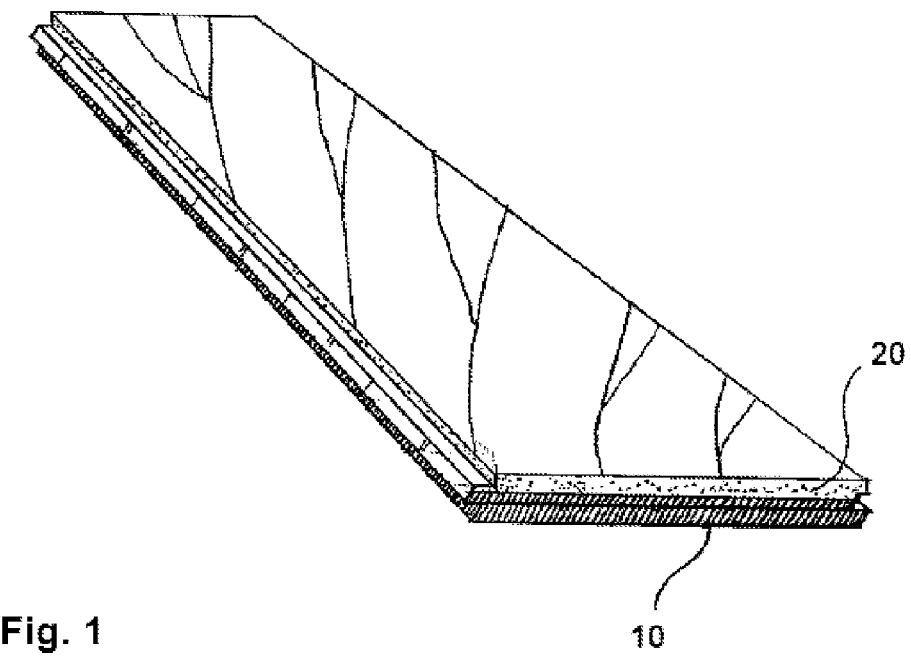
FIG. 1 is a perspective view of a conventional composed stave floor or conventional engineering floor.
Figure 2:
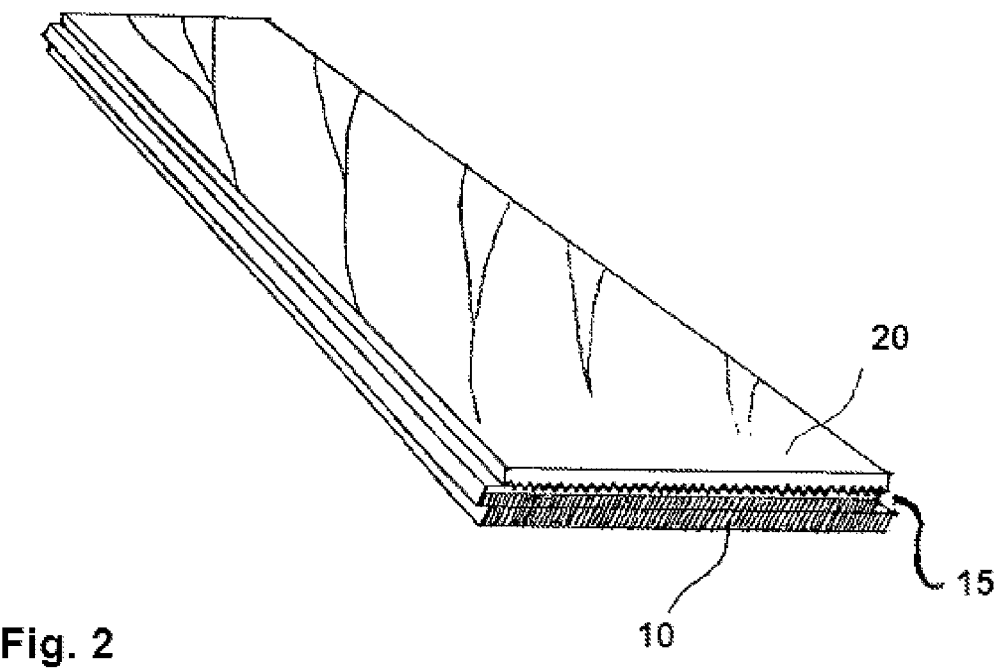
FIG. 2 is a perspective cross-section view of a composed stave floor or engineering floor according to an example embodiment.
Figure 3:
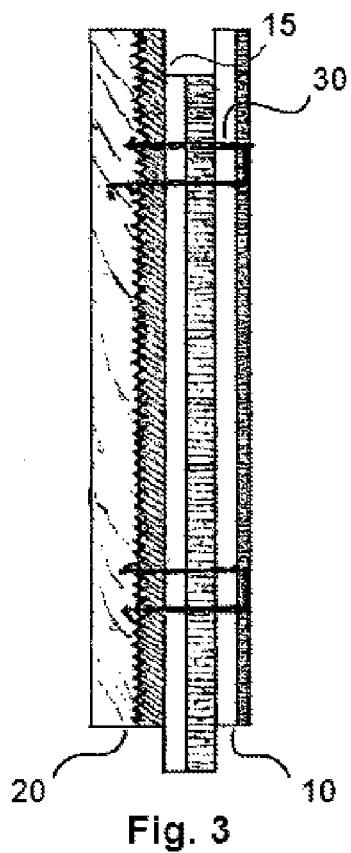
FIG. 3 is a side view of a composed stave floor or engineering floor according to an example embodiment.
Figure 4:
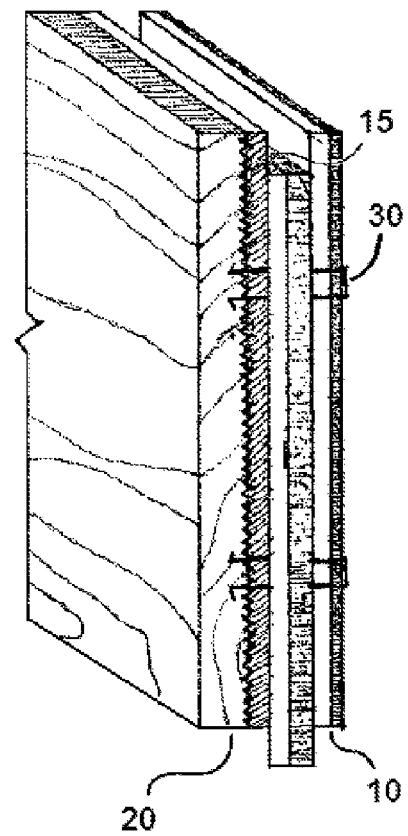
FIG. 4 is a perspective cross-section view of a composed stave floor or engineering floor which depicts the means of holding according to an example embodiment.

FIG. 1 is a perspective view of a conventional composed stave floor or conventional engineering floor. In FIG. 1, there is depicted a conventional composed stave floor or conventional engineering, floor which includes at least a base substrate (after face) (10) also known as a core and at least a sight substrate, of finished face or top part (20), having a thickness from 2 to 3 mm for the traffic surface;

FIG. 2 is a perspective cross-section view of a compose stave floor or engineering floor according to an example embodiment. In FIG. 2, is shown the base substrate (after face) (10) having a practical minimal thickness from 12 to 19 mm; the sight substrate or finished (face) (20) having a practical minimal thickness of at least 4 mm and the dendrites (15), for the traffic surface of a composed stave floor in accordance with the present invention;

FIG. 3 is a perspective cross-section view of a compose stave floor or engineering floor which illustrates multidirectional holding means, including: dendrite (15), in conjunction with adhesion means and horizontal reinforcement means, or in the union plane: glue, and adhesion means and vertical or normal reinforcement means perpendicular with respect to the union plane: clamp, divergent clamp and/or cemented clamp (30).

Referring to FIG. 3, the multidirectional holding means includes: dendrites (15), in conjunction with adhesion and horizontal reinforcement means; in the union plane: glue; and adhesion and vertical reinforcement means perpendicular or normal to the union plane: clamp, divergent clamp and/or cemented clamp (30); that join the base substrate (after face) (10) with thickness from 15 to 19 mm and the sight substrate or of finished (face) (20) having a practical minimal thickness of at least 4 mm, for the traffic surface of a composed stave floor in accordance with the present invention.

In an embodiment, the face substrate of the example embodiment is obtained from decorative or functional substrate, wood cut in tangential form, quarter form or another possible cutting, giving it a beautiful appearance and without limiting the manifestation of the natural seams, preserving its properties of uniform physical resistance that is maintained along the length of the entire substrate.

EXAMPLES

Example of Composed Stave Floor or Conventional Engineering Floor

Figure 5:
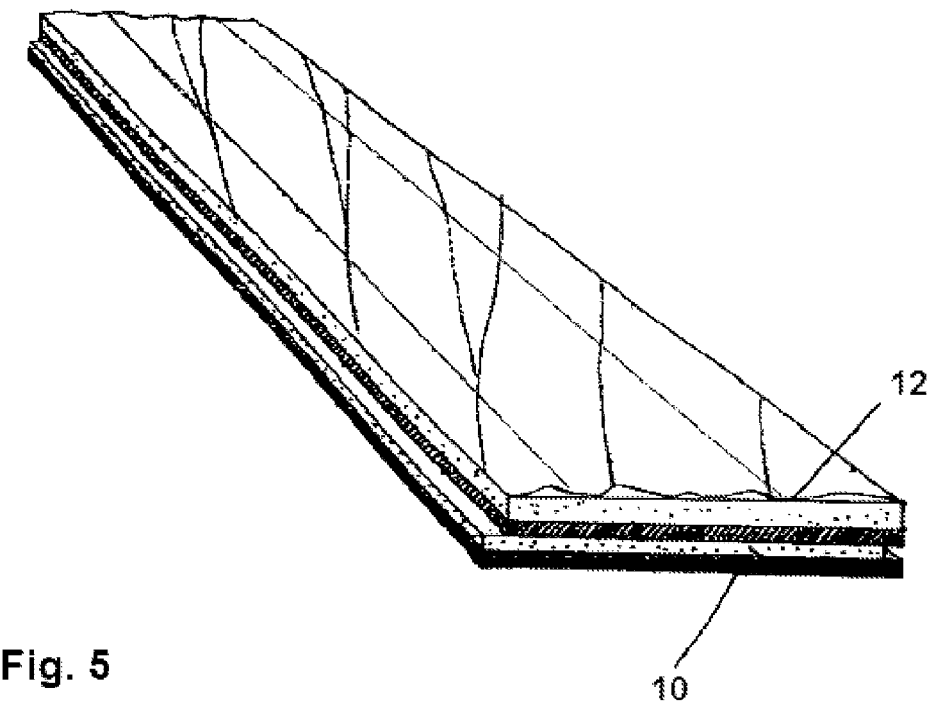
FIG. 5 is a representation that shows a perspective top view of a conventional composed stave floor or floor of conventional engineering floor showing detachment.

A conventional composed stave floor or conventional engineering floor was manufactured including at least a base substrate (after face) also known as a core and at least a sight substrate, of finished (face) or top part for the traffic surface. After a short period of time, the conventional composed stave floor exhibited detachment as shows in FIG. 5.

Figure 6:
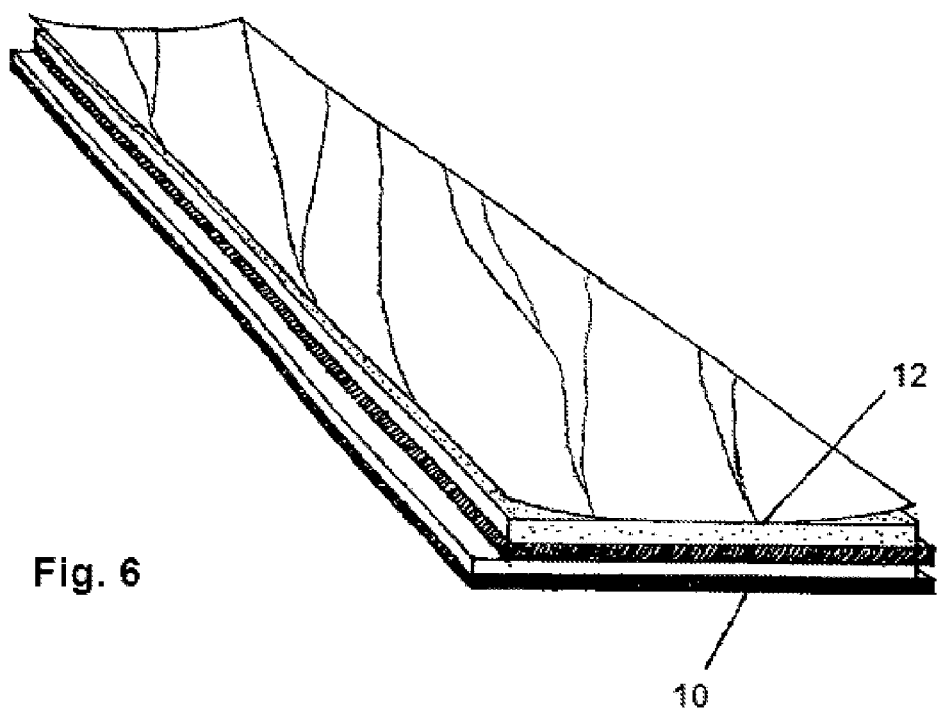
FIG. 6 shows a top view of a conventional composed stave floor or floor of conventional engineering floor, wavy deformed.

On the other hand a test of deformation was conducted by applying the glue in conventional form to the sight substrate, of finished (face) or top part for the traffic surface, resulting in a simple sight perceptible frizziness as shown in FIG. 6.

Example of Composed Stave Floor or Engineering Floor of the Invention

A composed stave floor or engineering floor of the example embodiment, was manufactured comprising a base substrate (after face) having a thickness of 15 mm and a sight substrate, of finished (face) or top part for the traffic surface having thickness of 6 mm. The assembly of both substrates was carried out by gluing both substrates, using multidirectional holding means: dendrite (15), in conjunction with adhesion and horizontal reinforcement means in the union plane: glue; and adhesion and reinforcement vertical means normal to the union plane: clamp, divergent clamp and/or cemented clamp (30), the clamps being distributed in an uniform way. The composed stave floor of the present invention thus obtained did not present deformation or any detachment. After a period of use when it required corrective maintenance, it was possible to provide the mentioned maintenance, obtaining again the physical, aesthetic and functional properties of the original floor. Thus, the example compose stave floor herein provides the floors with increased durability.

The example embodiments being thus described, it Will be obvious that the same may be varied in many ways. Such variations are not to be regarded as a departure from the spirit and scope of the example embodiments, and all such modifications as would be obvious to one skilled in the art are considered to be included within the scope of the following claims.

The invention claimed is:

1. A method for the manufacture of engineering floors, comprising:
   providing a base wood layer having a thickness of at least 12 mm and having a toothed upper facing surface,
   providing a top surface wood layer having a thickness of at least 4 mm and having a toothed lower facing surface configured to engage the toothed upper facing surface of the base wood layer for horizontal reinforcement of the engineering floor, and
   assembling the base wood layer and top surface wood layer together with multidirectional holding means consisting of:
   contact between the two toothed facing surfaces of the base wood layer and top surface wood layer,
   an adhesive provided along the toothed surfaces of the base wood layer and top surface wood layer for vertical reinforcement of the engineering floor, and
   one or more clamps attached to the engineering floor for clamping the base wood layer, adhesive, and top surface wood layer together.

2. The method of claim 1, wherein the adhesive consists of glue.

3. The method of claim 1, wherein the base wood layer is selected from one in a group consisting of decorative or functional boards, medium density fiber (MDF) boards, minor quality woods and PVC.

4. The method of claim 1, wherein assembling the base wood layer and the top surface wood layer further comprises providing constant pressure between both layers, in order to uniformly distribute the glue between both layers.

5. An engineering floor obtainable from the method of claim 1.

* * * * *